Feb. 6, 1973  D. W. WALKER ET AL  3,715,239

ELECTROCHEMICAL CELL CLOSURE AND METHOD OF MAKING

Filed April 5, 1971

INVENTORS:
DOUGLAS W. WALKER
LELAND M. GILLMAN
ROBERT E. STARK

BY *Curtis H. Castleman, Jr*

United States Patent Office 3,715,239
Patented Feb. 6, 1973

3,715,239
ELECTROCHEMICAL CELL CLOSURE AND
METHOD OF MAKING
Douglas W. Walker, Littleton, Leland M. Gillman, Denver, and Robert E. Stark, Littleton, Colo., assignors to The Gates Rubber Company, Denver, Colo.
Filed Apr. 5, 1971, Ser. No. 131,236
Int. Cl. H01m 1/02
U.S. Cl. 136—133
14 Claims

ABSTRACT OF THE DISCLOSURE

An electrochemical cell closure between the cell top and container is described comprising: A well formed between the upper protruding cell container mouth and upper protruding marginal portion of the cell top; a dam of an insulating material interposed in sealing relation between the walls of the well; and sealing material poured into the well and held by the dam sealingly bridging the cell container and top. In one embodiment, the insulating dam is made of a compressible material which is crimped inwardly prior to flowing the sealing material into the well.

BACKGROUND OF THE INVENTION

This invention relates to fluid and air-tight insulating seals for electrochemical containers, and more particularly relates to an insulating seal between a battery container wall and a cell top where both are preferably made of metallic materials.

It has long been known that battery cells, such as primary Leclanche cells, which experience relatively low internal pressures may be sealed by pouring a heat hardenable compound such as wax or pitch around the protruding carbon rod, thereby bridging the carbon rod with the cell container to form the seal. While these seals have generally been satisfactory for the purposes for which they have been intended, these seals are usually effective only when the internal pressure developed in the battery cell is relatively low. This type of seal would be particularly ineffective for use in secondary cells where internal pressures will often rise well above 200 p.s.i. While secondary cells are often provided with a type of safety valve mechanism in the cell top to allow reduction of internal pressure to a desired predetermined pressure, these safety valves are often unreliable. Consequently, there is a need for an effective seal for battery cells which will withstand high internal pressures and axial loading, and further will be a configuration useful in conjunction with a safety valve mechanism whether or not reliable. It is a primary object of this invention to provide these and other needs and obviate drawbacks of the prior art.

Pertinent prior art may be found in the U.S. Patent Office Classification Class 136, Batteries. Specific relevant references include U.S. Pat. Nos. 2,410,826; 2,444,872; 2,692,907; 3,338,750 and 3,409,168.

SUMMARY OF THE INVENTION

Briefly described, the present invention comprises: (1) an electrochemical cell container having a mouth opening; (2) a cell top closure fitting in said opening and provided with a centrally disposed safety valve, said top having an upright extended portion near its marginal extremity; (3) an insulating positioning ring engaging and interposed between the top closure and cell container providing a dam for the annular well defined by the cell container wall and upright extended portion of the cell top; and (4) a heat hardenable sealing material filling at least a portion of the well to form the seal between the top closure and cell container.

In an alternative embodiment, the insulating positioning ring is made of a compressible and preferably resilient material which may be radially inwardly compressed prior to filling the well with the sealing material. This type of closure is particularly useful when a low viscosity sealing material is employed. Penetration of the sealing material around the edges of the positioning ring and into the interior of the cell is prevented. Furthermore, higher axial loads may be withstood when this combination of radial squeeze and heat hardenable seal is employed.

The closures of the present invention are particularly useful in electrochemical cells which develop or may develop high internal pressures. Examples of such cells include secondary alkaline battery cells, fuel cells, storage batteries and certain primary cells.

BRIEF DESCRIPTION OF THE DRAWINGS

The invention will be more readily understood by reference to the accompanying drawings, in which like numerals designate like parts in the several figures, and wherein.

PREFERRED EMBODIMENTS OF THE INVENTION

Figure 1:
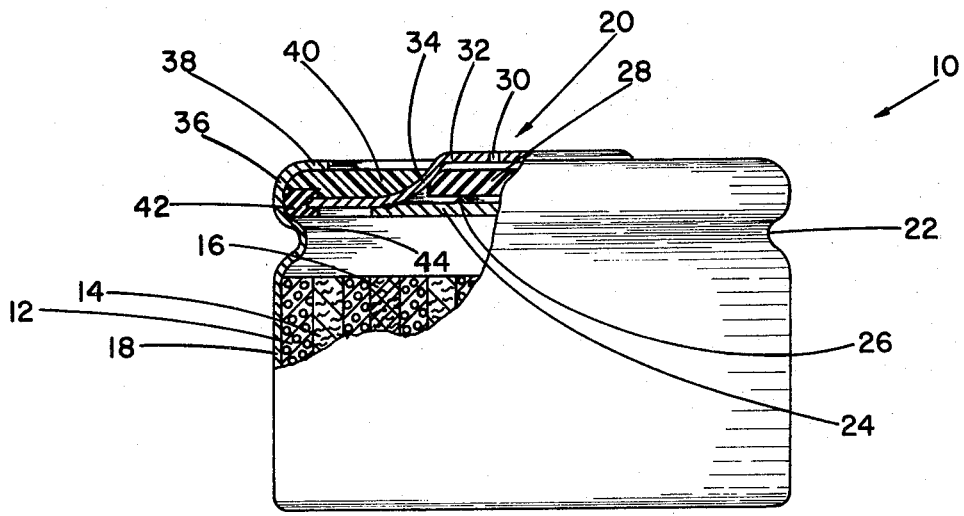
FIG. 1 is a partial cut-away elevational view of a completed battery cell having the closure means of the present invention.

In FIG. 1, a battery cell generally designated at 10 is comprised of an interior cell pack consisting of alternate separator layers 12, positive plate 14 and negative plate 16 in a spirally wound configuration. Prior to forming the closure according to the present invention, electrical connections from the electrodes of the cell pack to the cell container 18 and cell cover 20 are made in any of the standard ways such as by pressure contact or via a welded tab (not shown). Necessary electrolyte is also conventionally added prior to closure.

The cell container 18 is crimped at 22 to provide a ledge 44 for the closure assembly. The cell top cover generally designated at 20 is comprised of an elongated disc cover 24 which has a raised annular seat 26 containing a generally centrally disposed aperture (not shown) in fluid communication with the interior of the battery cell. Resilient means 28 is positioned over the aperture and bears against the surface of the seat 26. In turn, top cover 32 bears against the resilient means 28 and is joined to the cover disc 24, such as by a welding connection.

Excessive gas pressure build-up in the cell urges the resilient means 28 away from the seat 26 to allow escape of the gas through aperture 30 into the atmosphere.

The closure according to the present invention is comprised of a trough or well defined by an upwardly extending portion or wall 34 of the top cover 32 and an upwardly extending mouth portion 36 of the container 18. An elastomeric positioning ring 42 is interposed between the top cover wall 34 and inner wall portion 36 of the cell container to form a dam. This positioning ring 42 should tightly engage the cell top and the cell container to dam and prevent by-pass of sealing material into the interior of the cell. The well, so defined above, it at least partially filled with sealing or potting material 40. The well is filled with enough sealing material so that a firm bond exists between the cell container inner wall 36 and top cover portion 34.

Preferably the cell container mouth is provided with a radially inwardly extending ledge 38 which serves the purposes of facilitating loading and reducing axial loading on the closure assembly. It may be desirable to wrap or coat the outer portion of the ledge 38 with an insulating material to prevent shorting during cell operation.

Figure 2:
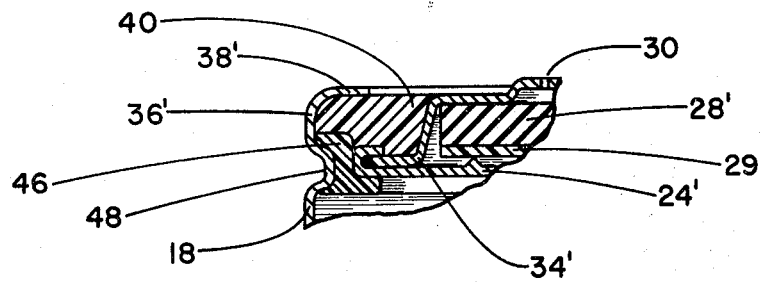
FIG. 2 is an enlarged fragmentary elevational view depicting an alternative closure means according to the present invention.

An alternative embodiment of the invention is shown in FIG. 2. In this embodiment the positioning ring 46 is made of a compressible polymeric material resistant to cold flow. The cell wall 18 of the battery container is radially compressed inwardly at 48, e.g. by crimping, to closely engage the positioning ring between the cell container wall and the rounded disc cover extension 24'. Alternatively, the ring 46 may be force fitted about an inner circumferential ledge or embossment provided at 48. The ring 46 dams the well defined by upwardly extending cell corner wall 34' and cell container wall 36'. As in FIG. 1, the mouth of the container is bent or crimped inwardly at 38' to minimize axial loading. In this embodiment, the safety release valve within the cover contains a resilient rubber disc 28' having a lower coating 29 of neoprene which bears on an annular seat surrounding an aperture (not shown) in communication with the cell interior.

Figure 3:
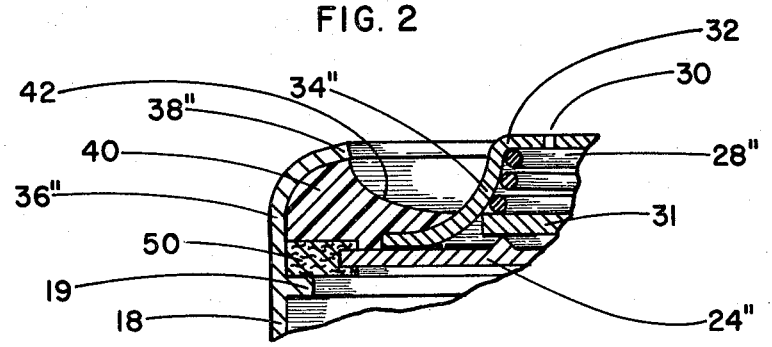
FIG. 3 depicts a further alternative closure configuration of the invention.

In the embodiment shown in FIG. 3, the cell container 18 is provided with a ledge or indentation 19 upon which sits a fiber positioning ring 50, which functions as the retaining means for the well defined by upright extended cover portion 34" and extended cell container wall portion 36". The mouth of the container has a radially inwardly curved position 38" to minimize axial loading. This curved portion 38" also facilitates centrifugal loading of the sealant material 40, i.e. as may be utilized in mass producing the battery cells. As a result of the centrifugal loading, the sealing material, if relatively viscous, will often harden in a generally curved configuration 42 rather than more or less horizontally as shown in FIGS. 1 and 2. In this embodiment, the resealable safety valve means is comprised of a compression spring 28" which bears on an elastomeric disc 31 and is adapted to release at a predetermined pressure.

The positioning ring, in general, should have good mechanical integrity and be resistant to attack by cell fluids in which the positioning ring may come into contact, e.g. electrolyte, and must be a good insulator, i.e. having low electrical conductivity. Among the materials which may be utilized for the positioning ring include: fibrous materials, exemplified by materials made from cardboard (corrugated or otherwise), wood fibers, fiberglass, rag stock, and hemp fibers; fibrous materials coated or impregnated with substances exemplified by phenol formaldehyde, styrene, polyethylene, tetrafluoroethylene, wax or paraffin, and epoxy or polyester resins; relatively rigid materials exemplified by ceramics, glass, alumina, and clay materials; elastomeric materials exemplified by natural and synthetic rubbers such as SBR (rubber copolymers of styrene and butadiene); and compressible polymeric materials exemplified by molded polystyrene, polycarbonate, ABS (copolymers of acrylonitrile, butadiene and styrene), nylon, polyvinylchloride (PVC), polysulfones, polyphenylene oxides, and cross-linked polyethylene. This latter group of compressible polymeric compounds is preferably characterized by resistance to cold flow, commonly defined as the creepage or gradual deformation of a material being subjected to a constant load.

The positioning ring may also accept a compatible coating of a sealant such as asphalt, vinyls, or polyethylenes.

The potting or sealing material may be selected from a wide variety of insulating materials which will form a bond with the metal container and/or cell top. Additionally, the sealing material may and preferably does form a bond with the positioning ring as well. The sealant is made to flow into the previously defined well in the fluid state and thereafter allowed to harden, such as by the application of heat. Preferably the sealing material will cure and be made hard under ambient temperature and pressure. A suitable catalyst may be optionally used to promote curing. Various thermosetting, thermoplastic, and chemisetting resins may be utilized as the sealing material, exemplified by polymethylacrylate resins, phenol formaldehyde resins, epoxy resins and hydrophobic resins such as polytetrafluoroethylene. Also, an epoxy preform ring may be utilized by heating it in situ, liquifying it so that it flows into the well. Hard curing rubbers such as urethane rubbers, and polyethylene based hot melts, etc., may also be employed. It is preferred that if a thermoplastic sealing material is employed that it melt at a temperature greater than about 200° F. In general, the sealing material should have dimensional stability so that it will not be appreciably deformed at operating temperatures.

It should be understood that the sealing material selected should be compatible with the positioning ring in which it will come into contact and further that the viscosity and wettability characteristics of the sealing material should not be such that the resin would unduly permeate through or creep around the positioning ring. For example, if a fiber positioning ring is employed, an epoxy resin would be a compatible sealing material, whereas a urethane rubber sealing material might tend to creep through the fiber ring and would be unsuitable. However, the urethane sealing materials could be satisfactorily used in conjunction with a compressible polymeric positioning ring. These design considerations will be appreciated by those skilled in the art.

It is preferred that the cell closures of the present invention will withstand internal battery pressures of at least about 600 p.s.i. and more preferably at least about 800 p.s.i.

It will also be readily apparent to those skilled in the art that the surfaces of the battery container and top cover which form the sidewalls of the well should be preferably free of any contaminants which would prevent adhesion of the sealing compound. These wall surfaces may be specially cleaned prior to introduction of the sealing compounds. For example, this could be done ultrasonically. Etching or pickling of the metal surface of the well walls might also be employed to insure adequate bonding.

It should be understood that the invention is capable of a variety of modifications and variations which will become apparent to those skilled in the art upon a reading of the present specification and these are to be included within the scope of the claims appended hereto.

What is claimed is:

1. In a secondary electrochemical cell having a container and a cell top insulatingly fitting in the mouth of the container, said cell top provided with a generally centrally disposed safety valve means, and said top having an upright extended portion displaced radially inwardly from its marginal portion, in combination therewith, a cell closure comprising:

an insulating positioning ring engaging the cell top at its marginal portion, the outer radial portion of the ring in turn engaging the inner wall of the cell container at a position inside and below its mouth to thereby define a radially inwardly curved or bent extended wall and mouth portion of the container free from contact with said positioning ring; and a well, defined by said curved extended mouth portion of the container and said upright extended portion of the cell top, of which at least a portion is filled with an insulating sealing material to form a bond between the extended wall or mouth portion of the container with the cell top.

2. The electrochemical cell of claim 1 wherein the extended mouth portion is radially inwardly curved in a manner to facilitate centrifugal loading of sealing material into the well.

3. The electrochemical cell of claim 1 wherein the positioning ring is made of a fibrous material having mechanical integrity.

4. The electrochemical cell of claim 1 wherein the positioning ring is made of a compressible polymeric material resistant to cold flow.

5. The electrochemical cell of claim 4 wherein the cell container has been radially inwardly compressed to intimately engage the polymeric ring with the cell container and top.

6. The electrochemical cell of claim 1 wherein the positioning ring is made from a material selected from the group consisting of ceramics, glass, alumina and clay materials.

7. The electrochemical cell of claim 4 wherein the compressible material is selected from the group consisting of polystyrene, polycarbonate, copolymers of acrylonitrile, butadiene and styrene, nylon, polyvinylchloride, polysulfones, polyphenylene oxides, cross-linked polyethylene.

8. The electrochemical cell of claim 6 wherein the material is nylon.

9. The electrochemical cell of claim 1 wherein the sealing material is selected from the group consisting of insulating thermosetting, thermoplastic and chemisetting resins.

10. The electrochemical cell of claim 1 wherein the sealing material is an epoxy resin.

11. A battery cell closure having an internal pressure withstand capability of at least about 600 p.s.i. comprising:
(a) a cylindrical container;
(b) a circular cell top adapted to close the mouth of the container, said top provided with a generally centrally disposed resealable safety valve means, and said top having an upstanding wall portion displaced near its marginal edge;
(c) an insulating positioning ring made of a compressible polymeric material resistant to cold flow interposed between and intimately engaging the cell top marginal portion and the inner wall of the container below its mouth to thereby define an annular well between the mouth of the cell container and the upstanding wall portion of the cell top, said well further defined by a radially inwardly curving container wall mouth free from contact with said positioning ring; and
(d) an insulating sealing material filling at least a portion of the well, bridging and bonding the cell container and top.

12. A sealed battery cell containing a spirally wound stack of electrodes and separators therebetween, said battery cell having the closure as defined in claim 11.

13. A method of sealing an electrochemical cell top having an upstanding wall portion within the mouth and adjacent inner wall of a cylindrical container comprising:
(a) forming a seat in the inner wall of the container well below the mouth of the container to define an upwardly extending mouth portion;
(b) engaging with said seat a compressible polymeric ring characterized by a resistance to cold flow;
(c) compressing or crimping the container radially inwardly at a position circumferential of the container to thereby form a compression fit between the cell top, inner wall of the container and interposed polymeric ring;
(d) bending substantially said extended mouth portion radially inwardly to thereby form an annular marginal well bounded on its sides by the upstanding wall portion of the top and said extended and bent mouth portion of the container; and
(e) filling at least a portion of said well with an insulative sealing material to form a bond between said container inner wall and mouth portion with said upstanding wall portion of the cell top.

14. The method of claim 13 wherein the insulative sealing material is centrifugally delivered to said annular well.

References Cited

UNITED STATES PATENTS

| | | | |
|---|---|---|---|
| 2,399,089 | 4/1946 | Anthony | 136—133 |
| 2,444,616 | 7/1948 | Rock | 136—133 |
| 2,704,780 | 3/1955 | MacFarland | 136—133 |
| 3,484,301 | 12/1969 | Gray | 136—133 |
| 2,179,816 | 11/1939 | Drummond | 136—133 |
| 2,536,696 | 1/1951 | Ruben | 136—133 |
| 3,068,312 | 12/1962 | Daley et al. | 136—133 |

DONALD L. WALTON, Primary Examiner

U.S. Cl. X.R.

136—169, 178